(12) United States Patent
Tuauden et al.

(10) Patent No.: US 8,381,380 B2
(45) Date of Patent: Feb. 26, 2013

(54) DEVICE FOR FAST ASSEMBLY OF TOOLS ON A SUPPORT

(75) Inventors: Philippe Tuauden, Octeville-sur-Mer (FR); Dominique Germain, Octeville-sur-Mer (FR); Eric Devaux, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 480 days.

(21) Appl. No.: 12/373,645

(22) PCT Filed: Jul. 20, 2007

(86) PCT No.: PCT/FR2007/001248
§ 371 (c)(1),
(2), (4) Date: May 28, 2009

(87) PCT Pub. No.: WO2008/009828
PCT Pub. Date: Jan. 24, 2008

(65) Prior Publication Data
US 2009/0315281 A1 Dec. 24, 2009

(30) Foreign Application Priority Data

Jul. 21, 2006 (FR) .................................. 06 06650

(51) Int. Cl.
- *B25B 27/14* (2006.01)
- *B25B 1/02* (2006.01)
- *B25B 1/10* (2006.01)
- *B25B 5/10* (2006.01)
- *B25B 5/00* (2006.01)
- *B24B 5/02* (2006.01)
- *H01R 4/30* (2006.01)
- *B23Q 3/12* (2006.01)

(52) U.S. Cl. ........... 29/271; 269/184; 269/249; 439/803
(58) Field of Classification Search .................... 29/211; 269/184, 249, 170; 439/803
See application file for complete search history.

(56) References Cited

U.S. PATENT DOCUMENTS
(Continued)

FOREIGN PATENT DOCUMENTS
DE 226 826 A1 9/1985
DE 239 755 A1 10/1986
(Continued)

OTHER PUBLICATIONS

Japanese Office Action for Japanese Application No. 2009-520015, dated Sep. 13, 2011.

*Primary Examiner* — Lee D Wilson
*Assistant Examiner* — Alvin Grant
(74) *Attorney, Agent, or Firm* — Sughrue Mion, PLLC (57) ABSTRACT

The device for fast assembly of a tool on its support comprises a bolt attached to said support and disposed within a bore with a through hole and a mandrel, which is attached to the tool as such and disposed within said through hole and interacting with said bolt. At the junction between the tool and its support, the device comprises centering and locking means which consist of a set of the tenon and mortise type, which set extends perpendicularly to the mandrel and thus forms a T-shaped structure of the assembly, which confers high rigidity to the tool. Said assembly device is in particular suitable for tools such as actuators or pliers, i.e. tools which are utilized in machines for packaging flasks, bottles or the like.

14 Claims, 4 Drawing Sheets

U.S. PATENT DOCUMENTS

| | | | | |
|---|---|---|---|---|
| 813,384 | A | * | 2/1906 | Kiefer .............................. 294/95 |
| 1,832,529 | A | * | 11/1931 | Carlson ........................ 72/31.02 |
| 2,396,823 | A | * | 3/1946 | Burbank et al. ............ 74/424.71 |
| 2,420,895 | A | * | 5/1947 | Merriman ..................... 439/803 |
| 2,467,103 | A | * | 4/1949 | Wester ............................ 29/271 |
| 2,947,333 | A | * | 8/1960 | Johnson ........................ 269/170 |
| 3,330,021 | A | * | 7/1967 | Jacobsen ........................ 29/261 |
| 3,700,250 | A | * | 10/1972 | Bautz .............................. 279/35 |
| 3,794,220 | A | * | 2/1974 | Valle ......................... 222/153.09 |
| 3,843,316 | A | * | 10/1974 | Amberg et al. ............... 432/124 |
| 3,857,648 | A | * | 12/1974 | Eggert ............................ 408/17 |
| 3,878,597 | A | * | 4/1975 | Hoskins ......................... 29/271 |
| 4,083,624 | A | * | 4/1978 | Timmer ......................... 439/803 |
| 4,215,521 | A | * | 8/1980 | Hartness ........................ 53/248 |
| 4,266,329 | A | * | 5/1981 | Feller et al. ..................... 29/222 |
| 4,293,327 | A | * | 10/1981 | Northup ........................... 65/64 |
| 4,555,840 | A | * | 12/1985 | Nakamura ..................... 29/465 |
| 4,557,649 | A | * | 12/1985 | Jeal ................................ 411/40 |
| 4,701,989 | A | * | 10/1987 | Cayzer ........................... 29/271 |
| 4,715,104 | A | * | 12/1987 | Schoenwetter et al. ........ 29/271 |
| 4,742,648 | A | * | 5/1988 | Ketteringham ............... 451/232 |
| 4,826,230 | A | | 5/1989 | Truchet |
| 4,883,188 | A | * | 11/1989 | Barth .......................... 215/12.1 |
| 4,961,701 | A | * | 10/1990 | Barth ............................. 425/527 |
| 5,009,443 | A | * | 4/1991 | Howatt ......................... 280/477 |
| 5,184,996 | A | * | 2/1993 | Rode et al. ...................... 493/84 |
| 5,287,677 | A | * | 2/1994 | Hunter ........................... 53/398 |
| 5,419,427 | A | * | 5/1995 | Wurgler ..................... 198/803.7 |
| 5,429,651 | A | * | 7/1995 | Bolin .............................. 65/241 |
| 5,467,527 | A | * | 11/1995 | Zanini et al. .................... 29/773 |
| 5,536,231 | A | * | 7/1996 | Nilsson ......................... 493/315 |
| 5,584,161 | A | * | 12/1996 | Zanini et al. .................... 53/317 |
| 5,673,536 | A | * | 10/1997 | Easter et al. .................... 53/398 |
| 5,787,563 | A | * | 8/1998 | Jenkins et al. .................. 29/417 |
| 5,799,380 | A | * | 9/1998 | Pfeifer ............................ 29/252 |
| 5,810,516 | A | * | 9/1998 | Ouellette ........................ 406/86 |
| 6,296,241 | B1 | * | 10/2001 | Harrison ....................... 269/249 |
| 6,490,843 | B1 | * | 12/2002 | May ............................ 53/389.1 |
| 6,726,193 | B1 | * | 4/2004 | Yates ............................ 269/184 |
| 2010/0313602 | A1 | * | 12/2010 | Hyre et al. ..................... 65/29.1 |

FOREIGN PATENT DOCUMENTS

| | | |
|---|---|---|
| DE | 239 756 A1 | 10/1986 |
| JP | 63-44789 U | 3/1988 |
| JP | 63-162183 A | 7/1988 |
| JP | 2005-131718 A | 5/2005 |

* cited by examiner

DEVICE FOR FAST ASSEMBLY OF TOOLS ON A SUPPORT

FIELD OF THE INVENTION

The present invention relates to a device for the fast assembly of a tool of the pusher, clamp or other type onto their support.

DESCRIPTION OF THE PRIOR ART

These tools may be encountered on various machines such as, for example, machines used to move objects of the box, bottle, flask, etc. type, and they are associated with a support which may consist of a transfer arm, if it is a simple box pusher, or a more or less complex gripping head, if it involves clamps for the handling of flasks, bottles or the like.

This type of equipment is encountered, for example, on machines for boxing flasks, bottles or the like and tools have to be changed frequently to take account of the different formats of products to be boxed.

Certain tools, which are used to tip packages of the cardboard case type, are in the form of starwheels, with a wheel placed on each side of the conveyor. There also, depending on the installation, tool changes may be relatively frequent, each tool being suited to one type of case.

In the current configurations, the tool is assembled onto its support notably by means of screws to satisfy the imperatives of mechanical strength. Specifically, the tools usually have a considerable overhang when they manipulate, for example, relatively large and heavy objects such as flasks or bottles.

The most widely used assembly method is an assembly by screw; it is an effective and sturdy assembly method but it is not practical when it is used in installations that are likely to manipulate several types of boxes and/or packages whose formats may vary considerably. Specifically, the time necessary to carry out a tool change is relatively long, particularly in the case of clamps.

The stresses generated, on the one hand, by the handling rates which are increasingly fast and, on the other hand, by the ever-increasing forces that are applied to the tools in question, have always ruined and rejected any form of installation other than that explained above.

SUMMARY OF THE INVENTION

The object of the present invention is to propose an assembly configuration which makes it possible to reconcile precision and reliability for the various tool, even of large size, subjected to high handling rates and to considerable forces as is the case in the boxing installations.

A further object of the invention is to improve the flexibility of the installations which can then process relatively different formats of flasks, bottles, boxes or packages.

Another object is to simplify these tool-changing operations which may, thanks to the invention, be carried out without the aid of tools such as wrenches, clamps or other tools, with, as a consequence, a significant reduction in the time necessary to carry out said tool change.

The invention therefore relates to an assembly device for the fast installation and removal of a tool, suitable for its destination, on/from the appropriate support, which assembly device comprises, for each tool, on the one hand, at said support, a bolt placed in a bore with a through hole and, at the tool itself, a mandrel which is housed in said through hole and interacts with said bolt and, on the other hand, at the junction between the tool and its support, centering and immobilization means consisting of an arrangement of the mortice-tenon type, which arrangement extends perpendicularly to said mandrel, forming with the latter a T-shaped assembly structure.

According to a preferred arrangement of the invention, the centering and immobilization means, in mortice-tenon form have a V section, which V extends perpendicularly to the assembly mandrel, on either side of the latter, over a length which is of the order of the height of the protruding portion of said mandrel, in order to ensure the rigidity of the assembly.

Still according to the invention, the angle of the V of the assembly means in mortice-tenon form is between 40 and 60°, preferably of the order of 50°.

According to another arrangement of the invention, the bolt is in the form of a cylindrical body one end of which is arranged in the form of an actuation button to deactivate said bolt, and the other end of which comprises a return spring to keep said bolt in the active locking position, which bolt comprises, between the two ends of said body, indexing means consisting, for example, of a flat which interacts with a fitted part, which part is in the form of a bayonet and its end surface serves as a bearing surface for said return spring of said bolt.

According to a variant embodiment, the part in the form of a bayonet is formed with a tab taken from its central portion and in particular from the extension of its flange which is used to attach it to the sheath, which tab serves as an indexing member by interacting with the flat arranged on the bolt and, in addition, it serves as an abutment to retain said bolt, interacting with a shoulder arranged at the end of the latter, on the side of the spring, which makes it possible to have a complete, standalone item of equipment capable of being positioned directly on all types of tools.

Still according to the invention, the bolt is housed in a bore of the support which makes an angle with the normal line to the axis of the hole of the mandrel, which angle extends over a range from 0 to 10°, preferably 5°, and this angle is oriented in a direction which tends to promote a traction on said mandrel to clamp the tool onto its support.

Still according to the invention, the assembly device consists, for each tool, of two parts which are interposed between the support and the tool itself, which parts are assembled to the latter in an appropriate manner and are, for one of them, in the form of a sheath which is secured to said support, which sheath comprises the bolt and the vertical hole to accommodate the assembly mandrel which interacts with said bolt, and, for the other of them, in the form of a block, associated with the tool, which block comprises said assembly mandrel, and the adjacent surfaces of said sheath and of said block comprise centering and assembly means consisting of the arrangement of the mortice-tenon type which extends perpendicularly to said mandrel, forming with the latter the T-shaped assembly structure.

According to another arrangement of the invention, the assembly mandrel is mounted so as to allow an adjustment of its position on the support block so as to be able, as necessary, to take up the play that is likely to occur between said support block and the sheath, which support block comprises a vertical bore for the centering and guiding of said assembly mandrel, which vertical bore is extended by a tapping, with a diameter smaller than said bore, interacting with a thread arranged at the bottom end of said mandrel over a length that is greater than that of said tapping, which thread of said mandrel interacts with a nut which locks said mandrel at the bottom portion of said support block.

Still according to the invention, for a tool of the starwheel type used to tip packages of the case type, the assembly device comprises a sheath which consists of two sheaths placed end-to-end, head-to-toe, symmetrically relative to the axis of said starwheel, in order to accommodate two blocks on which half-starwheels are mounted, which blocks are locked by their own mandrel which interacts with the bolt of the corresponding sheath.

According to another arrangement of the invention, for tools of the clamp type, the active portion of these clamps is furnished with a skid made of material of the rubber type, which skid, of parallelepipedal shape, comprises, on its back, at least one cylindrical spigot capable of passing through a hole arranged in said clamp, which spigot is furnished with an extra thickness serving as an abutment, which extra thickness stops on the back of said clamp.

BRIEF DESCRIPTION OF THE DRAWINGS

But the invention will be described in greater detail with the aid of the following description and of the appended drawings, given as an indication, and in which.

DETAILED DESCRIPTION OF THE INVENTION

Figure 1:
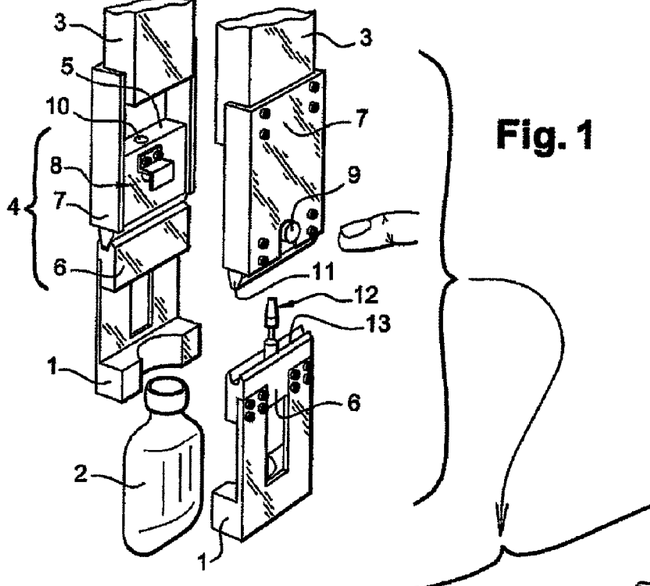
FIG. 1 shows schematically a tool of the clamp kind for the handling of flasks, bottles and other products of the same kind, fitted with the assembly device according to the invention, which tool is secured to the adjustable carrier arms of a handling head, not shown.

The tool represented in FIG. 1 comprises a pair of clamps (1) which are arranged to grasp a flask (2) for example.

Each element of these clamps (1) is supported by an arm (3) which is secured to the handling head, not shown, which arms (3) can be moved relative to one another to allow the flask (2) to be grasped or released.

The junction between each clamp (1) and the corresponding arm (3) is formed by means of a fast assembly device (4).

This fast assembly device (4) consists, for example, of a fixed portion secured to the arm (3) and a retractable, interchangeable portion which supports a clamp (1).

The fixed portion is called sheath (5) in the rest of the text and the retractable portion is called block (6).

A U-section plate (7) forms the junction between the sheath (5) and the arm (3) of the gripping head, not shown. Each tool, such as the clamp (1), is assembled by a screw or other element to its block (6).

The sheath (5) comprises a bolt system (8) and the bolt itself, explained in detail below, can be operated by means of a button (9) which appears as a protrusion relative to the plate (7), naturally accessible to the operator responsible for installing and removing each clamp element.

Figures 2, 16, 17:
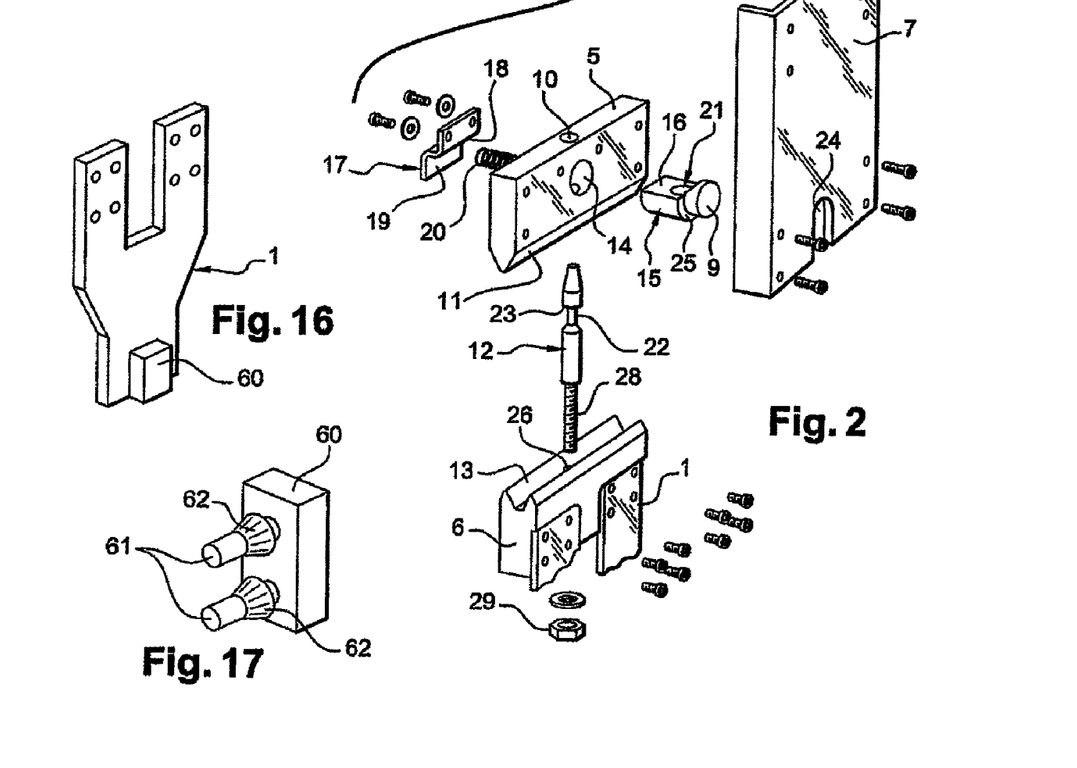
FIG. 2 is an exploded view of one of the elements of the tool represented in FIG. 1.
FIG. 16 represents, in isolation and on a larger scale than in FIG. 1, a clamp furnished with a skid made of material of the rubber type, for gripping particular products such as, for example, relatively flexible tubes of creams or other products, and which are placed on the cap and handled by their fishtail shaped end.
FIG. 17 shows, in perspective and on a yet larger scale, the skid installed on the clamp represented in FIG. 16.

As shown in detail in FIG. 2, the rapid tool-element assembly device (4) consists of the sheath-shaped part (5), secured to the plate (7) and the block-shaped retractable part (6).

The sheath (5) comprises a vertical central hole (10) and a tenon (11) which extends over its bottom face.

The block (6) comprises a fitted mandrel (12) which interacts with the hole (10) of the sheath (5) and a mortice (13) the shape of which matches that of the tenon (11) so that they fit together.

The centering and the rigidity of the assembly of the two parts relative to one another, that is to say the sheath (5) and the support block (6), are achieved by the mortice (13)-tenon (11) type assembly with, as a particular feature, a V-shaped section, the angle of which relative to the axis of the device is of the order of 50°, between 40 and 60°.

This V extends perpendicularly to the mandrel (12), on either side of the latter, over a length which is of the order of the height of the protruding portion of said mandrel (12), in order to ensure a good rigidity of the assembly.

The aforementioned assembly means, namely the mandrel (12) and the mortice-tenon assembly, have a T shape which gives the assembly device (4) great rigidity.

The sheath (5) also comprises a cylindrical bore (14) to accommodate the actual bolt (15). This bore (14) is perpendicular to the hole (10) of the mandrel (12) and its axis intersects that of the latter.

The bolt (15) has the form of a cylindrical body which passes through the sheath (5). It comprises a flat (16) which makes it possible to index its position relative to the sheath (5), which flat (16) interacts with a part (17) which is attached to the inner face of said sheath (5). This part (17) has the shape of a bayonet and comprises a flat horizontal surface (18) interacting with the flat (16) arranged on the bolt (15); it also comprises an end surface (19) which is perpendicular to the axis of the bolt (15) and which serves as an abutment, both for said bolt (15) and for a spring (20) which keeps said bolt (15) in the active locking position.

This bolt (15) also comprises a particular hole (21) with two bores of different diameters, the axes of which are situated in the same plane, for the passage and locking of the mandrel (12):—a bore of which the diameter is substantially greater than that of the top end of the mandrel (12) and—a bore of which the diameter is markedly smaller and which corresponds to that of the groove (22) arranged on said mandrel (12).

The groove (22) in the form of a neck, fashions a shoulder (23) which interacts with the flat (16) of the bolt to immobilize the mandrel (12).

Figure 3:
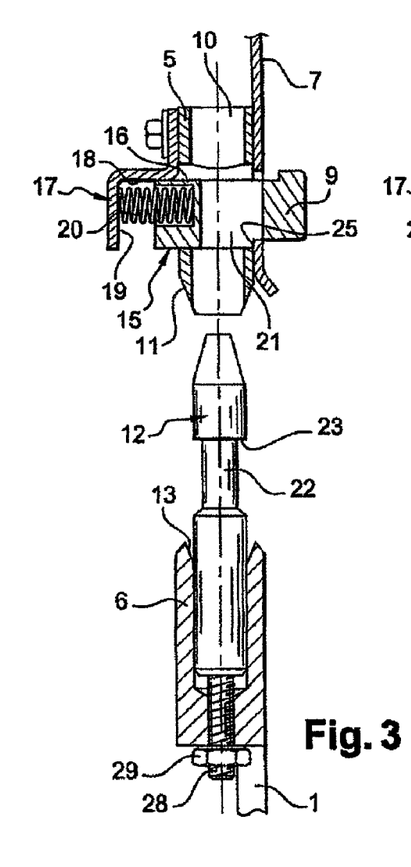
FIG. 3 shows a transverse cross section of the fast assembly device in the inactive position, and illustrates notably the bolt in its active position, with the block-shaped part furnished with the assembly mandrel, which mandrel is represented in an unfitted position.

On the inside, the bolt (15) interacts with the spring (20) which keeps it in the active locking position as shown in FIG. 3, which spring (20) presses on the vertical end surface (19) of the bayonet-shaped part (17). On the outside, the bolt (15) is held in its bore (14), according to a first embodiment, by means of the plate (7) which comprises a hole (24) the diameter of which is smaller than that of the body of said bolt but substantially greater than that of the button (9) to allow its passage and its actuation by the operator. The shoulder (25) between the body of the bolt (15) and the button (9) interacts with the plate (7) to keep said bolt in its housing of the sheath (5). A variant embodiment is explained below, with reference to FIGS. 10 to 13.

Figure 4:
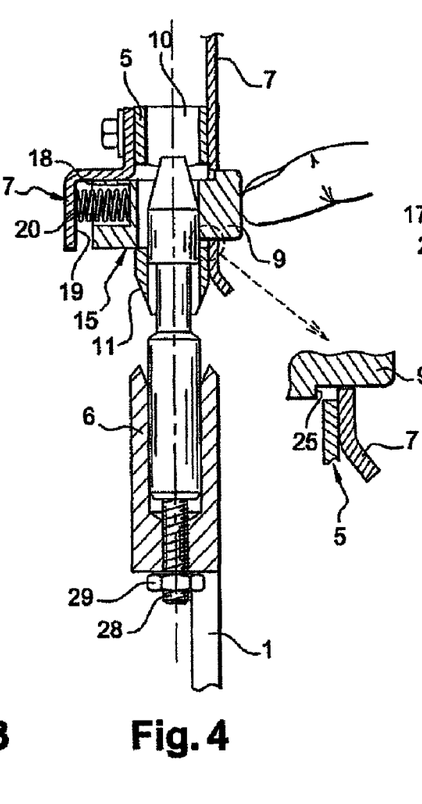
FIG. 4 shows a transverse cross section of the assembly device during the unlocking or during the fitting of the block-shaped part, and of its mandrel, into the sheath-shaped part, the bolt being held in the inactive position by the operator, FIG. 5 also shows a transverse cross section of the assembly device in the active locking position.

By pressing the button (9), as illustrated in FIG. 4, the operator pushes the bolt (15) in toward the bayonet-shaped part (17) which has the effect of releasing the mandrel (12). In the reverse operation, the fitting of the mandrel (12) in the sheath (15) is made easier by the presence of a cone at its end.

Figure 5:
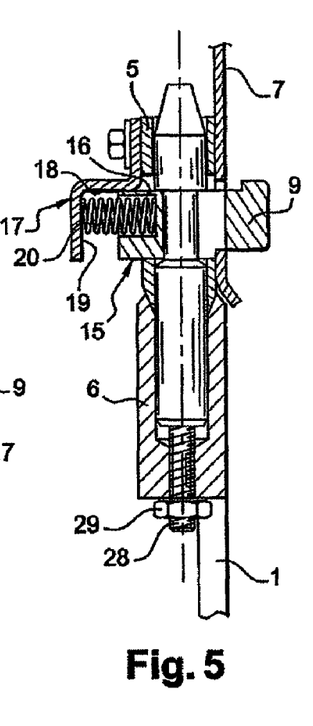

The assembly device (4) is locked with the return of the bolt (15) to the active position under the effect of the pressure exerted by the retaining spring (20) and in particular by the locking hole (21) which interacts with the groove (22) formed in the mandrel (12), as shown in FIG. 5.

To facilitate the installation of the bolt (15) and reduce the play of the assembly, said bolt may, as explained in detail below with reference to FIGS. 7 and 8, be slightly inclined.

Figure 6:
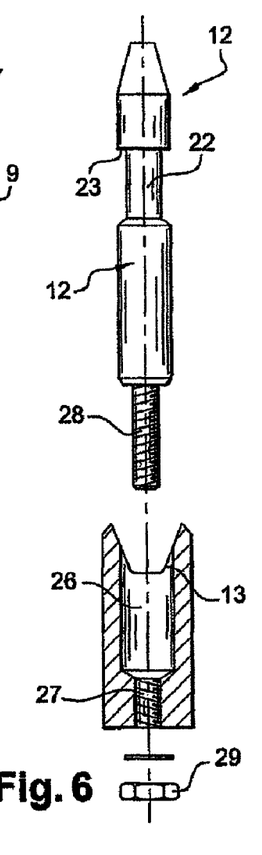
FIG. 6 shows a transverse cross section of the block and the mandrel and its locking nut, the whole assembly being shown disassembled in order to illustrate the means for adjusting the mandrel in its block.

The play of the assembly is adjusted first of all by means of the mandrel (12) which is mounted adjustably into the block (6) as shown in FIG. 6.

The block (6) comprises a vertical bore (26) to house the mandrel (12), which mandrel is mounted slidingly in said bore (26) which serves as a guide thereto. This bore (26) is extended by a tapping (27) the diameter of which is smaller than that of said bore (26), which tapping (27) interacts with a thread (28) arranged at the bottom end of said mandrel (12) and this thread (28), the length of which is markedly greater than that of said tapping (27), protrudes beneath the block (6), allowing a nut (29) to be fitted which locks the adjustment of said mandrel (12) relative to said block (6).

Figures 7, 8, 9, 10, 11, 12, 13:
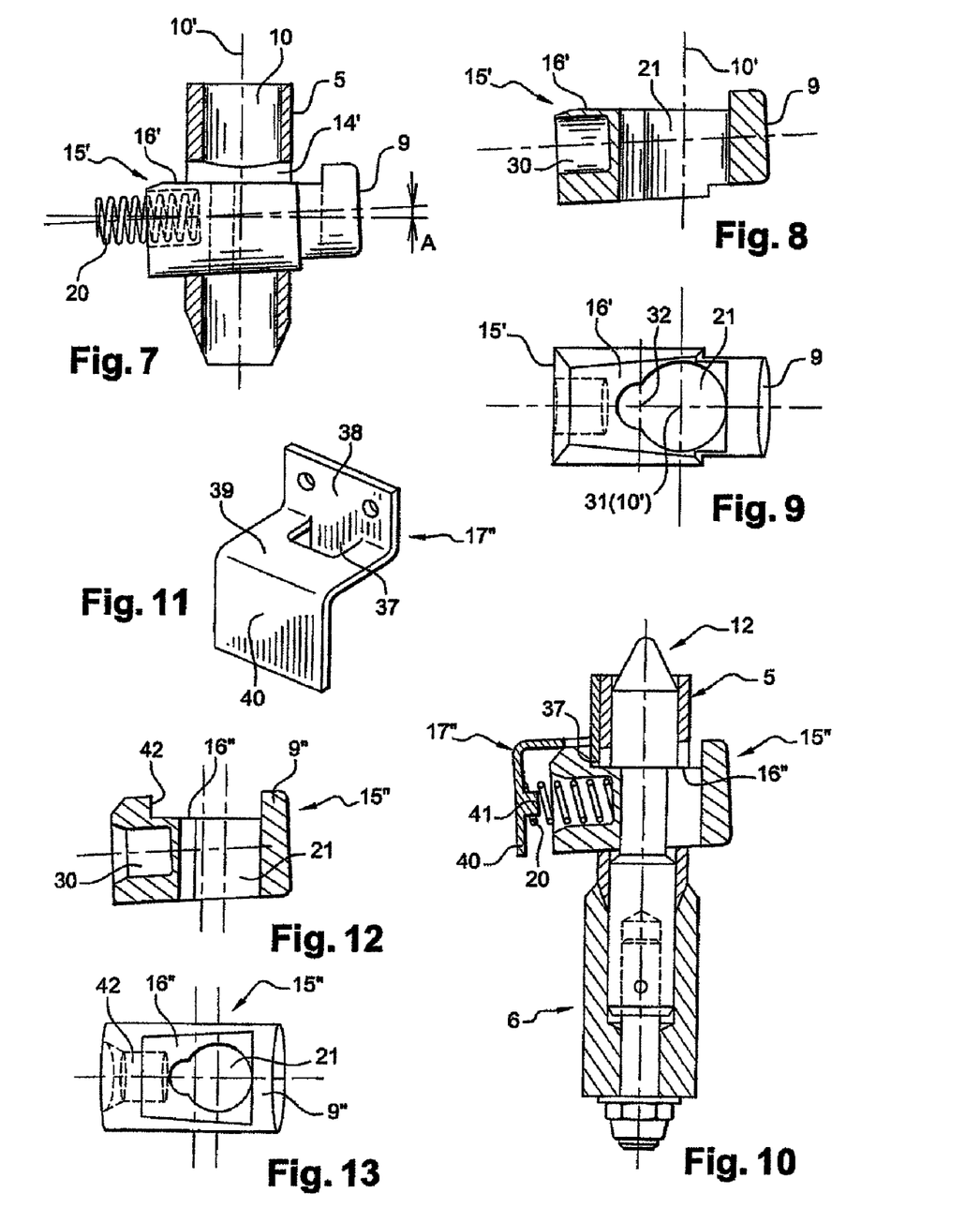
FIG. 7 shows the sheath with a bolt which makes an angle with the normal line to the axis of the hole of the mandrel.
FIG. 8 is a side view of the bolt of FIG. 7, shown in isolation.
FIG. 9 is a top view of the bolt shown in FIG. 8.
FIG. 10 shows a variant embodiment of the bolt and of its mounting on the sheath.
FIG. 11 represents the bayonet-shaped part, in perspective, which makes it possible to index the position of the bolt and to keep said bolt secured to the sheath.
FIG. 12 shows the bolt in isolation, as it is mounted in the sheath of FIG. 10.
FIG. 13 shows the bolt seen from above.

The sheath (5) which is represented with the bolt (15') in FIG. 7 comprises a bore (14') the axis of which forms an angle A of the order of 5° with the normal line to the axis (10') of the hole (10) in which the mandrel (12), not shown in this figure, is housed.

The plane of the flat (16') which is arranged on the bolt (15') is, for its part, perpendicular to the axis (10') of the hole (10). Therefore, when the bolt (15') moves to its active locking position, the flat (16') moves slightly on the axis (10'); it forms a sort of corner and it exerts a certain traction on the mandrel (12) by means of the shoulder (23) of the latter.

The angle A that the axis of the bore (14) makes with the normal line to the axis (10') of the hole (10) may in fact extend from 0 to approximately 10°. It is relatively small to prevent any reversibility phenomenon.

FIG. 8 shows the bolt (15') of FIG. 7. This bolt (15') has a body, as above, of generally cylindrical shape. One of the ends comprises the operating button (9) and the other end comprises the housing (30) for the spring (20).

The flat (16') makes an angle of the order of 5°, for example, with the axis of the bolt (15'); it is perpendicular to the axis (10') of the hole (10) and to the axis of the hole (21) which is arranged in the bolt for the passage of the mandrel (12).

FIG. 9 shows, seen from above, the hole (21) through which the mandrel (12) passes, which hole (21) comprises two axes: the axis (31) which corresponds to the hole allowing the insertion of the mandrel (12) and the axis (32) which corresponds to the hole enabling it to house the groove (22) of said mandrel (12).

FIG. 10 shows a variant embodiment of the assembly device which makes it possible to have a standalone assembly that can be easily adapted to all types of tools, as explained in detail below with reference to FIGS. 14 and 15.

This assembly device comprises an unchanged block (6), furnished with its mandrel (12) and a sheath (5) of which the bolt (15") interacts with a modified part (17") which has several functions: an indexing function, as above, and a general function of holding said bolt (15") relative to said sheath (5).

This bayonet-shaped part (17") is made from a metal sheet plate that is cut and folded; it comprises, as shown in FIGS. 10 and 11, an original arrangement which has the form of a tab (37) obtained by a U-shaped cutout of the central portion of said plate.

This tab (37) is situated in the extension of the flange (38) of the part (17"), that is to say the flange which is used for the assembly of this part (17") with the sheath (5); it replaces the surface (18) of the part (17) represented in FIGS. 3 to 5, which was used for the indexing of the bolt (15").

The part (17") retains a flange (39) in which the tab (37) cutout is found, which flange (39) forms the junction between the assembly flange (38) and the flange (40) which serves as a bearing surface for the spring (20) and which also serves as an abutment for the bolt (15) when it is fully pushed in.

The inner surface of the flange (40), which serves as a bearing surface for the spring (20), may comprise, as can be seen in FIG. 10, a post (41) for centering the spring (20).

The bolt (15") shown in FIGS. 10, 12 and 13, has, as above, a cylindrical shape; it comprises a flat (16") for its indexing, which flat (16") extends between the operating button (9) and an abutment (42) situated near of the housing (30) of the return spring (20).

Figure 14:
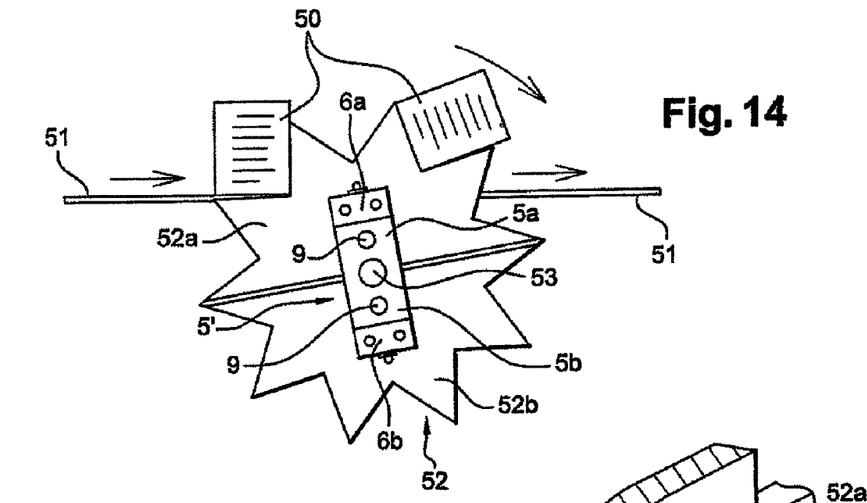
FIG. 14 shows a starwheel system which is installed alongside a conveyor to tip packages, of the cardboard case type, to 900, which starwheel is seen from the outside, that is to say from the side of access to the button for unlocking the half-starwheels.

This assembly device may be suitable for many applications and in particular for installations in which it is necessary to change the tools for handling products, such as packages in the form of cases shown in FIG. 14.

The tool shown in FIG. 14 makes it possible to tip the packages (50) which arrive on the conveyor (51) and which subsequently continue, after tipping, on the same conveyor to a grouping station, not shown, for the purpose of palletization, for example.

A starwheel (52) is installed on each side of the conveyor (51) and each wheel consists of two portions (52a), (52b), in the form of a half-moon and these two portions are joined together on a shaft (53) by means of the assembly system.

This assembly system has the particular feature of comprising a central part, which serves as a sheath (5'), centered on and attached to the shaft (53) of the wheel (52), which sheath (5') in fact consists of two sheaths (5a), (5b), placed end-to-end and head-to-toe.

Each sheath (5a), (5b) accommodates a block (6a), (6b), respectively, on which the tool is installed and in particular each portion (52a), (52b), in the form of a half-moon, of the starwheel (52).

FIG. 14 is an external view of the assembly device, showing the buttons (9) which allow the unlocking of the half-moons (52a, 52b).

Figure 15:
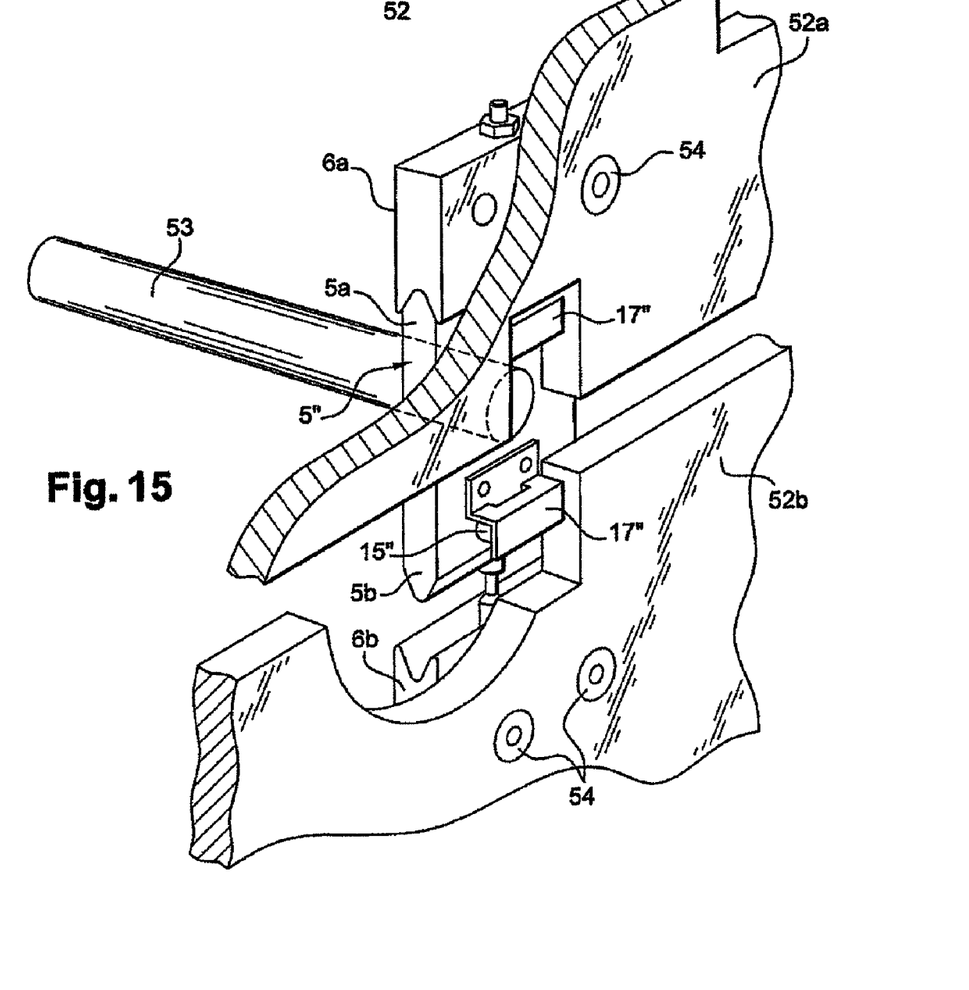
FIG. 15 shows, in perspective, partially represented, the starwheel system interacting with the assembly device according to the invention.

FIG. 15 shows, partially represented, the half-moons (52a, 52b): the half-moon (52a) is in place, locked onto the shaft (53) while the half-moon (52b) is disassembled from its sheath (5b).

Each half-moon (52a, 52b) is secured to a block (6a, 6b) respectively, attached by appropriate means such as the screws (54).

Each block (6a, 6b) comprises a mandrel (12), as explained in detail above, and the whole assembly interacts with the corresponding sheath (5a, 5b).

In this FIG. 15, the multifunction parts (17") can be seen which serve: to index the bolt (15"), to keep it assembled to the sheath (5') and to form the return spring bearing surface of said bolt (15"), which spring is not visible in this FIG. 15.

The half-moons (52a, 52b) are made of a thermoplastic material of the polyethylene kind; they are suited to each type of packaging (50) to be handled.

FIG. 16 represents a particular arrangement of the clamps (1) of the tool of FIG. 1. These clamps (1) form wearing parts which are subjected to clamping and friction cycles.

They have the form of a simple cut sheet metal plate whose active surface is coated with an appropriate material. But the contact surface of these clamps may deteriorate fairly rapidly and it is worthwhile to be able to easily replace this fragile portion forming said contact surfaces, rather than to replace the whole of the clamp.

The arrangement proposed in FIG. 16 consists of a skid (60) which is made of a material of the rubber type and this skid has the shape of a parallelepiped which is simply placed on the active portion of the clamp (1).

This skid (60) comprises, on its face which is in contact with the structure of the clamp, at least one cylindrical spigot (61) and this spigot is furnished with an extra thickness (62) in the form of a truncated cone which serves as an abutment and as a member for locking said skid onto the clamp (1).

The spigots (61) pass through the sheet metal of the clamp through appropriate holes, not visible in the figure, which have the diameter of said spigots.

If the skid (60) should wear or in the event of damage, these spigots (61) are easy to cut, making it possible to replace said skids rapidly.

The invention claimed is:

1. A tool assembly device for fast installation and removal of a tool, on and from a support, the assembly device comprising, for each tool:
    (a) at the support, a bolt placed in a bore with a vertical central hole, wherein the axis of the bore intersects the axis of the vertical central hole, and, wherein at the tool, a mandrel which is housed in the vertical central hole interacting with the bolt; and
    (b) at the junction between the tool and the support, a centering and immobilization mechanism comprising an arrangement of the mortice and tenon type with the tenon extending over the bottom face of the vertical central hole at the support and, the mortice, located at the tool, and having a matching shape to that of the tenon so that the mortice and tenon fit together, the arrangement extending perpendicularly to the mandrel, forming with the mandrel a T-shaped assembly structure.

2. The tool assembly device as claimed in claim 1, wherein the centering and immobilization mechanism, in the mortice and tenon form, has a V section extending perpendicularly to the mandrel, on either side of the mandrel, over a length which is of the order of the height of the protruding portion of the mandrel, in order to ensure the rigidity of the assembly.

3. The tool assembly device as claimed in claim 2, wherein the angle of the V section is between 40° and 60°.

4. The tool assembly device as claimed in claim 2, wherein the angle of the V section at the centering means in the mortice and tenon form is between 40° and 50°.

5. The tool assembly device as claimed in claim 1, wherein the bolt is in the form of a cylindrical body, one end of which is arranged in the form of a button to deactivate the bolt, and the other end of which comprises a return spring to keep the bolt in the active locking position, the bolt comprising, between the two ends of the body, an indexing mechanism comprising a flat which interacts with a fitted part, which part is in the shape of a bayonet a part of which interacts with the flat and the end of which serves as a bearing surface for the return spring of the bolt.

6. The tool assembly device as claimed in claim 5, wherein the part, in the shape of a bayonet, is formed with a tab taken from its central portion, the tab serving as an indexing member by interacting with the flat arranged on the bolt and, in addition, serving as an abutment to retain the bolt, interacting with a shoulder arranged at the end of the bolt, on the side of the return spring.

7. The tool assembly device as claimed in claim 5, wherein the bolt is housed in a bore of the support of which an angle A with the normal line of the axis of the hole of the bolt extends over a range from 0 to 10°, and the angle is oriented in a direction which tends to pull on the mandrel to clamp the tool onto its support.

8. The tool assembly device as claimed in claim 5, wherein the bolt is housed in a bore of the support of which an angle A with the normal line of the axis of the hole of the bolt extends over a range from 0° to 5°, which angle is oriented in a direction which tends to pull on the mandrel to clamp the tool onto its support.

9. The tool assembly device as claimed in claim 1, comprising, for each tool, two parts which are interposed between the support and the tool:
    a first part located at the support and is in the form of a sheath which comprises the bolt and the hole to accommodate the mandrel interacting with the bolt, and,
    a second part at the tool and is in the form of a block, associated with the tool, the block comprising the mandrel,
    and the adjacent surfaces of the sheath and of the block comprise the arrangement of the mortice and tenon type extending perpendicularly to the mandrel, forming with the mandrel the T-shaped assembly structure.

10. The tool assembly device as claimed in claim 9, wherein the mandrel is mounted to be adjustable on the block, in the vertical direction, to take up the play between said the block and the sheath, after the locking of the mandrel, the block comprising a vertical bore for the guidance of the mandrel, extended by a tapping with a diameter smaller than the vertical bore, interacting with a thread arranged at the bottom end of the mandrel, the thread interacting with a nut to lock the mandrel.

11. The tool assembly device, of a starwheel kind used by torque to tip packages made of cardboard or other material, as claimed in claim 10, further comprising a double sheath, comprising two sheaths placed end-to-end and head-to-toe, symmetrically relative to the axis of the starwheel, in order to accommodate two blocks on which half-starwheels are mounted, the blocks are locked by their own mandrel which interacts with the bolt of the corresponding sheath.

12. The tool assembly device as claimed in claim 1, further comprising, for tools of the clamp type, on the active portion of these clamps, a skid made of material of the rubber type, which skid, of parallelepipedal shape, comprises, on a its back of the skid, at least one cylindrical spigot capable of passing through a hole arranged in the clamp, the spigot is furnished with an extra thickness serving as an abutment which stops on the back of the clamp.

13. A tool assembly device for fast installation and removal of a tool on and from a support, comprising:
   a fixed part comprising a first hole and a second hole passing through and transverse to the first hole;
   a bolt configured to be placed in the first hole;
   a moveable part comprising a mandrel configured to be placed in the second hole and cooperating with the bolt to secure the mandrel;
   a mortice and tenon joint formed by the fixed part and the moveable part, the mortice and tenon joint centers and immobilizes the moveable part relative to the fixed part, the mortice and tenon joint extending transverse to the mandrel.

14. The tool assembly device as claimed in claim 13, wherein the mandrel extends transverse to mortice and tenon joint forming a T-shaped structure.

* * * * *